United States Patent
Santhoff et al.

(10) Patent No.: US 7,027,483 B2
(45) Date of Patent: Apr. 11, 2006

(54) ULTRA-WIDEBAND COMMUNICATION THROUGH LOCAL POWER LINES

(75) Inventors: John Santhoff, San Diego, CA (US); Steven A. Moore, Escondido, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 136 days.

(21) Appl. No.: 10/456,047

(22) Filed: Jun. 6, 2003

(65) Prior Publication Data

US 2004/0022304 A1 Feb. 5, 2004

Related U.S. Application Data

(63) Continuation-in-part of application No. 10/177,313, filed on Jun. 21, 2002.

(51) Int. Cl.
*H04B 1/69* (2006.01)

(52) U.S. Cl. .................... 375/130; 375/257

(58) Field of Classification Search ........... 375/130, 375/257, 259; 340/310.01, 310.02, 538; 455/402, 270
See application file for complete search history.

(56) References Cited

U.S. PATENT DOCUMENTS

| | | |
|---|---|---|
| 3,728,632 A | 4/1973 | Ross |
| 4,641,317 A | 2/1987 | Fullerton |
| 4,743,906 A | 5/1988 | Fullerton |
| 4,813,057 A | 3/1989 | Fullerton |
| 4,815,106 A | 3/1989 | Propp |
| 4,864,589 A | 9/1989 | Endo |
| 4,979,186 A | 12/1990 | Fullerton |
| 5,051,720 A | 9/1991 | Kittirutsuneto |
| 5,278,862 A | 1/1994 | Vander Mey |
| 5,363,108 A | 11/1994 | Fullerton |
| 5,485,040 A | 1/1996 | Sutterlin |
| 5,491,463 A | 2/1996 | Sargeant |
| 5,523,760 A | 6/1996 | McEwan |
| 5,554,968 A | 9/1996 | Lee |
| 5,677,927 A | 10/1997 | Fullerton |
| 5,687,169 A | 11/1997 | Fullerton |

(Continued)

FOREIGN PATENT DOCUMENTS

EP    1 414 241 A1    4/2004

(Continued)

OTHER PUBLICATIONS

Echelon, "Power Line Communications", May 1997.

(Continued)

*Primary Examiner*—Don N. Vo
(74) *Attorney, Agent, or Firm*—Pulse-LINK, Inc.; Peter R. Martinez; Steven A. Moore (57) ABSTRACT

A system, method and apparatus structured to transmit a plurality of ultra-wideband pulses through an electric power medium is provided. One embodiment of the method comprises an ultra-wideband transmitter structured to transmit the plurality of ultra-wideband pulses through the electric power medium and an ultra-wideband receiver structured to receive the plurality of ultra-wideband pulses from the electric power medium. Another embodiment of the present invention comprises a power supply that provides ultra-wideband communications to devices that obtain power from the power supply. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

31 Claims, 6 Drawing Sheets

U.S. PATENT DOCUMENTS

| | | | |
|---|---|---|---|
| 5,729,607 | A | 3/1998 | DeFries et al. |
| 5,744,526 | A | 4/1998 | Goossens et al. |
| 5,745,837 | A | 4/1998 | Fuhrmann |
| 5,774,526 | A | 6/1998 | Propp et al. |
| 5,822,678 | A | 10/1998 | Evanyk |
| 5,828,946 | A | 10/1998 | Feisullin et al. |
| 5,832,035 | A | 11/1998 | Fullerton |
| 5,835,054 | A | 11/1998 | Warhus et al. |
| 5,864,284 | A | 1/1999 | Sanderson |
| 5,896,556 | A | 4/1999 | Moreland et al. |
| 5,937,342 | A | 8/1999 | Kline |
| 5,940,387 | A | 8/1999 | Humpleman |
| 5,944,842 | A | 8/1999 | Propp et al. |
| 5,960,031 | A | 9/1999 | Fullerton et al. |
| 5,963,581 | A | 10/1999 | Fullerton et al. |
| 5,982,276 | A | 11/1999 | Stewart |
| 5,995,534 | A | 11/1999 | Fullerton et al. |
| 6,031,862 | A | 2/2000 | Fullerton et al. |
| 6,040,759 | A | 3/2000 | Sanderson |
| 6,140,911 | A | 10/2000 | Fisher et al. |
| 6,178,217 | B1 | 1/2001 | Defries et al. |
| 6,218,979 | B1 | 4/2001 | Barnes et al. |
| 6,275,045 | B1 | 8/2001 | Eloy |
| 6,281,784 | B1 | 8/2001 | Redgate et al. |
| 6,373,377 | B1 | 4/2002 | Sacca et al. |
| 6,430,208 | B1 | 8/2002 | Fullerton et al. |
| 6,437,832 | B1 | 8/2002 | Grabb et al. |
| 6,492,897 | B1* | 12/2002 | Mowery, Jr. ........... 340/310.01 |
| 6,492,904 | B1 | 12/2002 | Richards |
| 6,496,104 | B1 | 12/2002 | Kline |
| 6,497,656 | B1 | 12/2002 | Evans |
| 6,505,032 | B1 | 1/2003 | McCorkle et al. |
| 6,529,166 | B1 | 3/2003 | Kanamaluru |
| 6,539,068 | B1 | 3/2003 | Hebron et al. |
| 6,549,567 | B1 | 4/2003 | Fullerton |
| 6,586,999 | B1 | 7/2003 | Richley |
| 6,611,223 | B1 | 8/2003 | Low et al. |
| 6,690,247 | B1 | 2/2004 | Kintis et al. |
| 6,721,298 | B1 | 4/2004 | Vella-Coleiro |
| 2001/0054953 | A1 | 12/2001 | Kline |
| 2002/0024423 | A1 | 2/2002 | Kline |
| 2002/0076193 | A1 | 6/2002 | Melick et al. |
| 2002/0116720 | A1 | 8/2002 | Terry et al. |
| 2003/0031191 | A1 | 2/2003 | El Wardani et al. |
| 2003/0202537 | A1 | 10/2003 | Rogerson et al. |
| 2005/0131922 | A1* | 6/2005 | Kennedy et al. ............ 707/100 |

FOREIGN PATENT DOCUMENTS

| | | |
|---|---|---|
| WO | WO 02/31986 | 4/2002 |

OTHER PUBLICATIONS

Dan Raphaeli, Evgeni Bassin, "A Comparison between OFDM, Single Carrier, and Spread Spectrum for high Data Rate PLC," Tel Aviv University, Israel, and Itran Communications, Apr. 1999.

"Powerline Coexistence", White Paper, Mar. 2001.

Echelon, Power Line Communications, May 1997.

Dan Raphaeli, Evgeni Bassin, A Comparison between OFDM, Single Carrier, and Spread Spectrum for high Data Rate PLC, Tel Aviv University, Israel, and Itran Communications, Apr. 1999.

Powerline Coexistence, White Paper, Mar. 2001.

Stephen Grossman, Existing In-Home Coax Can Support Data Comm, Electronic Design, Mar. 5, 2001, 3 pgs.

Noam Geri, Hybrid Coax-Wireless Multimedia Home Networks Using 802.11 Technology, Texas Instruments White Paper, Mar. 2003, 7 pgs.

Ken Davidson, CEBus Goes Coax, The Computer Applications Journal, Feb./Mar. 1992, 3 pgs, Issue 25.

Entropic Communications, Core Technology Description, entropic-communications.com, 2 pgs.

* cited by examiner

ULTRA-WIDEBAND COMMUNICATION THROUGH LOCAL POWER LINES

This is a continuation-in-part of co-pending U.S. patent application Ser. No. 10/177,313, filed Jun. 21, 2002, titled: ULTRA-WIDEBAND COMMUNICATION THROUGH A WIRED MEDIUM.

FIELD OF THE INVENTION

The present invention generally relates to ultra-wideband communications. More particularly, the invention concerns a method to transmit ultra-wideband signals through local power supply sources.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as in-home movies-on-demand and video teleconferencing demand high data transmission rates. Another example is interactive video in homes and offices.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. These large data files, as well as the large data files that provide real-time home video are simply too large to be feasibly transmitted without an increase in system bandwidth. The need for more bandwidth is evidenced by user complaints of slow Internet access and dropped data links that are symptomatic of network overload.

Internet service providers, cable television networks and other data providers generally employ conductive wires and cables to transmit and receive data. Conventional approaches to signal (i.e. data) transmission through a transmission medium, such as a wire or cable, is to modulate the signal though the medium at a frequency that lies within the bounds at which the medium can electrically conduct the signal. Because of this conventional approach, the bandwidth of a specific medium is limited to a spectrum within which the medium is able to electrically transmit the signal via modulation, which yields a current flow. As a result, many costly and complicated schemes have been developed to increase the bandwidth in conventional conductive wire and/or cable systems using sophisticated switching schemes or signal time-sharing arrangements. Each of these methods is rendered costly and complex in part because the data transmission systems adhere to the conventional acceptance that the bandwidth of a wire or cable is constrained by its conductive properties.

Therefore, there exists a need for a method to increase the bandwidth of conventional wired networks.

SUMMARY OF THE INVENTION

The present invention provides a system, method and apparatus to transmit ultra-wideband pulses, or signals through wire media that provide power. For example, one embodiment of the present invention may be a power supply source that enables ultra-wideband communication between devices that obtain electrical power from the power supply source.

In one embodiment of the invention, a method of transmitting an ultra-wideband signal comprises the steps of providing a wire medium that provides power, and transmitting an ultra-wideband signal through the wire medium.

Another embodiment of the present invention comprises a power supply that is structured to transmit a plurality of ultra-wideband pulses through an electric power medium. The power supply comprises at least one electric power outlet structured to provide electric power from the electric power medium. An ultra-wideband transmitter communicates with the electric power medium and with the electric power outlet and an ultra-wideband receiver also communicates with the electric power medium and with the electric power outlet.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Generally, a traditional cable television provider, a community antenna television provider, a community access television provider, a cable television provider, a hybrid fiber-coax television provider, an Internet service provider, or any other provider of television, audio, voice and/or Internet data receives broadcast signals at a central station, either from terrestrial cables, and/or from one or more antennas that receive signals from a communications satellite. The broadcast signals are then distributed, usually by coaxial and/or fiber optic cable, from the central station to nodes located in business or residential areas.

For example, community access television provider (CATV) networks are currently deployed in several different topologies and configurations. The most common configurations found today are analog signals transmitted over coaxial cable and Hybrid Fiber-Coax Systems (HFCS) that employ both fiber optic and coaxial cables. The analog coax systems are typically characterized as pure analog systems. Pure analog CATV systems are characterized by their use of established NTSC/PAL (National Television Standards Committee/Phase Alternation Line) modulation onto a frequency carrier at 6 or 8 MHz intervals.

HFCS is a combination analog—digital topology employing both coaxial (analog) and fiber optic (digital) media that typically supports digitally modulated/encoded television channels above channel 78. According to ANSI/EIA-542-1997, in the United States, the analog channels are modulated in 6 MHz allocations on channels 2 to 78 using frequencies from 55 to 547 MHz. When using HFCS, digital channels typically start at channel 79 and go as high as 136 and occupy a frequency range from 553 to 865 MHz. In some extended HFCS systems, channel assignments can go as high as channel 158 or 997 MHz. The current ANSI/EIA-542-1997 standard only defines and assigns channels to these limits. The actual wire/cable media itself is generally capable of transmitting frequencies up to 3 GHz.

In both CATV and HFCS systems, typically the satellite downlink enters the cable company's head-end and the video, and/or other data streams are de-multiplexed out. Individual video data streams (either NTSC, MPEG, or any other suitable protocol) are extracted from the satellite downlink stream and routed to modulators specific for individual television channels. The outputs from each modulator are then combined into one broadband signal. From this point the combined channels are amplified and sent out, either by coaxial or fiber optic cable, to the customers.

In a HFCS, before the combined broadband signal leaves the head-end the broadband signal is modulated onto a fiber optic cable for distribution into the field, such as residential neighborhoods, or business districts. Modulation of the broadband signal is typically accomplished in one of two ways. In the first method the entire broadband signal is sampled and digitized using a high speed Analog to Digital Converter (ADC). To perform reliable digital sampling, the data must be sampled at a rate at least twice the highest frequency component to meet Nyquist minimum sampling requirements. To provide a higher quality data stream, the signal should be sampled at 2.5 to 4 times the highest frequency, which entails sample rates of approximately 2 to 4 GHz. A parallel to serial converter then shifts the parallel output data of the ADC into a serial format. The serial data then drives a laser diode for transmission over the fiber optic cable. The second method is broadband block conversion where the entire spectrum of the broadband signal is modulated onto the fiber optic cable.

Designated access nodes are located in neighborhoods, business districts and other areas. The access nodes contain a high speed Digital to Analog Converter (DAC) and a de-serializer. A fiber optic receiver detects the laser-modulated signal at the access node. A parallel to serial converter de-serializes the data and it is feed to the high speed DAC. The data then leaves the access node on standard 75 ohm, RG-6 or RG-8 or other suitable coax cable and is distributed to the customer's premises. Thus, at the access node, the broadband signal is extracted from the fiber optic cable and transferred to a coaxial cable that connects to individual homes, apartments, businesses, universities, and other customers. Support of multiple customers is generally accomplished by the use of distribution boxes in the field, for example, on telephone poles or at ground level. However, as the signal is continuously split at the distribution boxes, the received bandwidth is reduced and the quality of the signal is diminished, thereby diminishing the video, audio, and other data quality.

The digital channels that generally reside on CATV channels 79 and higher are fundamentally different than the analog channels that generally reside on channels 2 through 78. The analog channels are comprised of modulated frequency carriers. The digital channels, which generally use the 6 MHz allocation system, are digitally modulated using Quadrature Amplitude Modulation (QAM). QAM is a method of combining two amplitude modulated signals into a single channel, thereby doubling the effective bandwidth. In a QAM signal, there are two carriers, each having the same frequency but differing in phase by 90 degrees. The two modulated carriers are combined for transmission, and separated after transmission. QAM 16 transmits 16 bits per signal, QAM 32, 64, and 256 each transmit 32, 54 and 256 bits per signal, respectively. QAM was developed to support additional video streams encoded with MPEG video compression. Conventional CATV and HFCS networks may employ QAM levels up to QAM 64 to enable up to 8 independent, substantially simultaneous MPEG video streams to be transmitted.

At the customer's location, the coaxial cable is connected to either a set-top box or directly to a television. The receiving device then de-multiplexes and de-modulates the video, audio, voice, Internet or other data. Although a television can directly receive the analog signal, a set-top box is generally required for reception of the digitally encoded channels residing on CATV channels 79 and higher.

The above-described networks, and other networks and communication systems that employ wired media, such as twisted-pair or coaxial cable, suffer from performance limitations caused by signal interference, ambient noise, and spurious noise. In these conventional wired media systems, these limitations affect the available system bandwidth, distance, and carrying capacity of the system, because the noise floor and signal interference in the wired media rapidly overcome the signal transmitted. Therefore, noise within the wired media significantly limits the available bandwidth of any wired system or network.

Generally, the conventional wisdom for overcoming this limitation is to boost the power (i.e., increase the voltage of the signal) at the transmitter to boost the voltage level of the signal relative to the noise at the receiver. Without boosting the power at the transmitter, the receiver is unable to separate the noise from the desired signal. Thus, the overall performance of wired media systems is still significantly limited by the accompanying noise that is inherent in wired media.

Increasing the available bandwidth of an established wired media network, while coexisting with the conventional data signals transmitted through the network, represents an opportunity to leverage the existing wired media network infrastructure to enable the delivery of greater functionality. Several methods and techniques have been proposed, but they are generally computationally intense, hence costly.

The present invention may be employed in any type of network that uses wired media, in whole, or in part. That is, a network may use both wired media, such as coaxial cable, and wireless devices, such as satellites. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a metropolitan area network (MAN), and a wide area network (WAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention employs a "carrier free" architecture which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wired media, but can be inexpensively deployed without extensive modification to the existing wired media network.

The present invention provides increased bandwidth by injecting, or otherwise super-imposing an ultra-wideband (UWB) signal into the existing data signal and subsequently recovers the UWB signal at an end node, set-top box, subscriber gateway, or other suitable location. Ultra-wideband, or impulse radio, employs pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, UWB has also been termed "carrier-free" in that no apparent carrier frequency is evident in the radio frequency (RF) spectrum. That is, the UWB pulses are transmitted without modulation onto a sine wave carrier frequency, in contrast with conventional radio frequency technology. Ultra-wideband requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Figure 1:
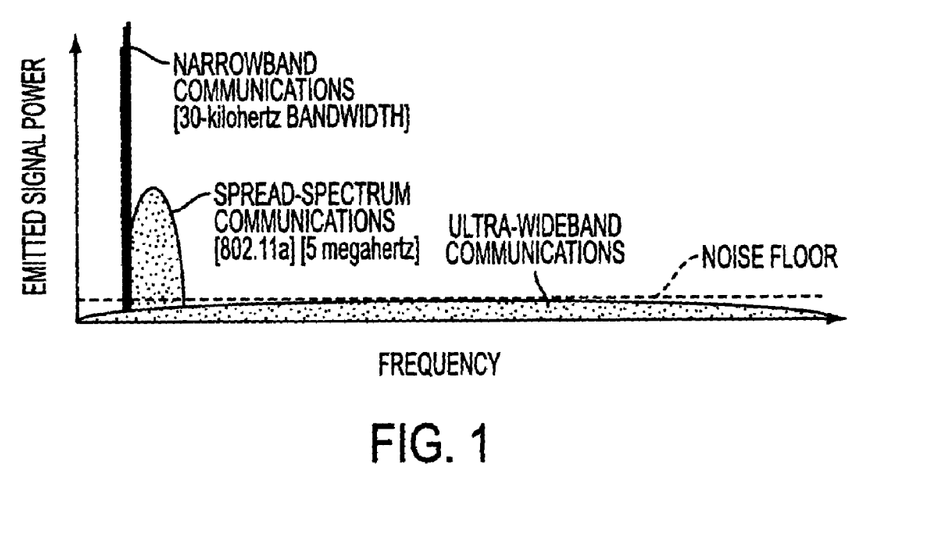
FIG. 1 is an illustration of different communication methods.

Another example of a conventional radio frequency technology is illustrated in FIG. 1. 802.11 a, a wireless local area network (LAN) protocol, transmits radio frequency signals at a 5 GHz center frequency, with a radio frequency spread of about 5 MHz.

Figure 2:
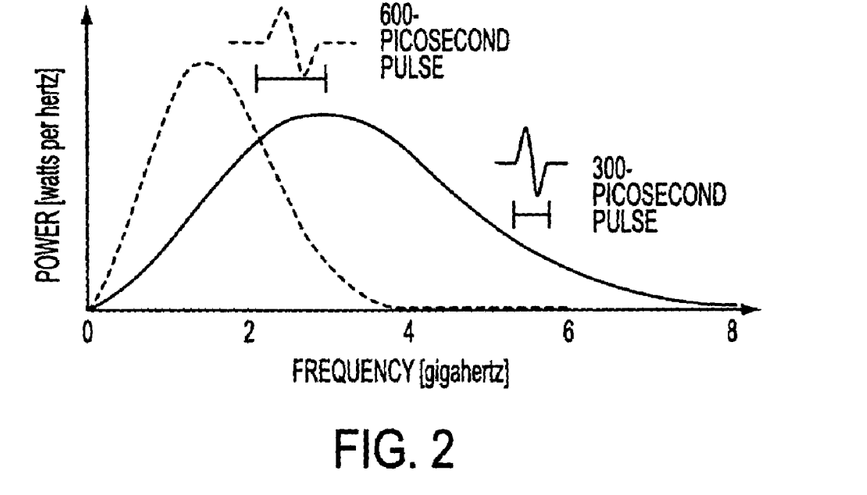
FIG. 2 is an illustration of two ultra-wideband pulses.

In contrast, a UWB pulse may have a 1.8 GHz center frequency, with a frequency spread of approximately 4 GHz, as shown in FIG. 2, which illustrates two typical UWB pulses. FIG. 2 illustrates that the narrower the UWB pulse in time, the higher its center frequency and the broader the spread of its frequency spectrum. This is because frequency is inversely proportional to the time duration of the pulse. A 600 picosecond UWB pulse will have about a 1.8 GHz center frequency, with a frequency spread of approximately 4 GHz. And a 300 picosecond UWB pulse will have about a 3 GHz center frequency, with a frequency spread of approximately 8 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt signal of one nano-second duration spreads the one-watt over the entire frequency occupied by the pulse. At any single frequency, such as at the carrier frequency of a CATV provider, the UWB pulse power present is one nano-watt (for a frequency band of 1 GHz). This is well within the noise floor of any wired media system and therefore does not interfere with the demodulation and recovery of the original CATV signals. Generally, the multiplicity of UWB pulses are transmitted at relatively low power (when sampled at a single, or specific frequency), for example, at less than −30 power decibels to −60 power decibels, which minimizes interference with conventional radio frequencies. However, UWB pulses transmitted through most wired media will not interfere with wireless radio frequency transmissions. Therefore, the power (sampled at a single frequency) of UWB pulses transmitted though wired media may range from about +30 dB to about −90 dB.

For example, a CATV system generally employs a coaxial cable that transmits analog data on a frequency carrier. Generally, amplitude modulation (AM) or QAM (discussed above) are used to transmit the analog data. Since data transmission employs either AM or QAM, UWB signals can coexist in this environment without interference. In AM, the data signal M(t) is multiplied with a cosine at the carrier frequency. The resultant signal y(t) can be represented by:

$$y(t)=m(t)\mathrm{Cos}(\omega_c t)$$

In a QAM based system multiple carrier signals are transmitted at the same carrier frequency, but at different phases. This allows multiple data signals to be simultaneously carried. In the case of two carriers, an "in phase" and "quadrature" carriers can carry data signals Mc(t) and Ms(t). The resultant signal y(t) can be represented as:

$$y(t)=Mc(t)\mathrm{Cos}(\omega_c t)+Ms(t)\mathrm{Sin}(\omega_c t)$$

However, as discussed above, an UWB system transmits a narrow time domain pulse, and the signal power is generally evenly spread over the entire bandwidth occupied by the signal. At any instantaneous frequency, such as at the AM or QAM carrier frequency, the UWB pulse power present is one nano-watt (for a frequency band of 1 GHz). This is well within the noise floor of any wired media system and therefore does not interfere with the demodulation and recovery of the original AM or QAM data signals.

Wired media communication systems suffer from performance limitations caused by signal interference, ambient noise, and spurious noise. These limitations affect the available bandwidth, distance, and carrying capacity of the wire media system. With wired communication systems, the noise floor and signal interference in the wired media rapidly overcome the transmitted carrier signal. This noise on the wired media is a significant limitation to the ability of the system to increase bandwidth. UWB technology makes use of the noise floor to transmit data, without interfering with the carrier signal. Moreover, UWB transmitted through a wired medium has distinct advantages over its use in a wireless environment. In a wired environment there are no concerns with intersymbol interference, and there are no concerns relating to multi-user interference.

For example, CATV channels typically occupy 6 MHz in the US and 8 MHz in Europe. These channels are arranged in a re-occurring pattern beginning at approximately 50 MHz and dependent on the CATV system, extend upward to 550 MHz, 750 MHz, 870 MHz, 1 GHz and higher. The present invention is capable of injecting UWB pulses into the existing CATV infrastructure. These UWB signals do not interfere or degrade existing frequency domain signals. Additionally, the UWB signals can carry vast amounts of information with digital meaning in the time domain.

Figure 3:
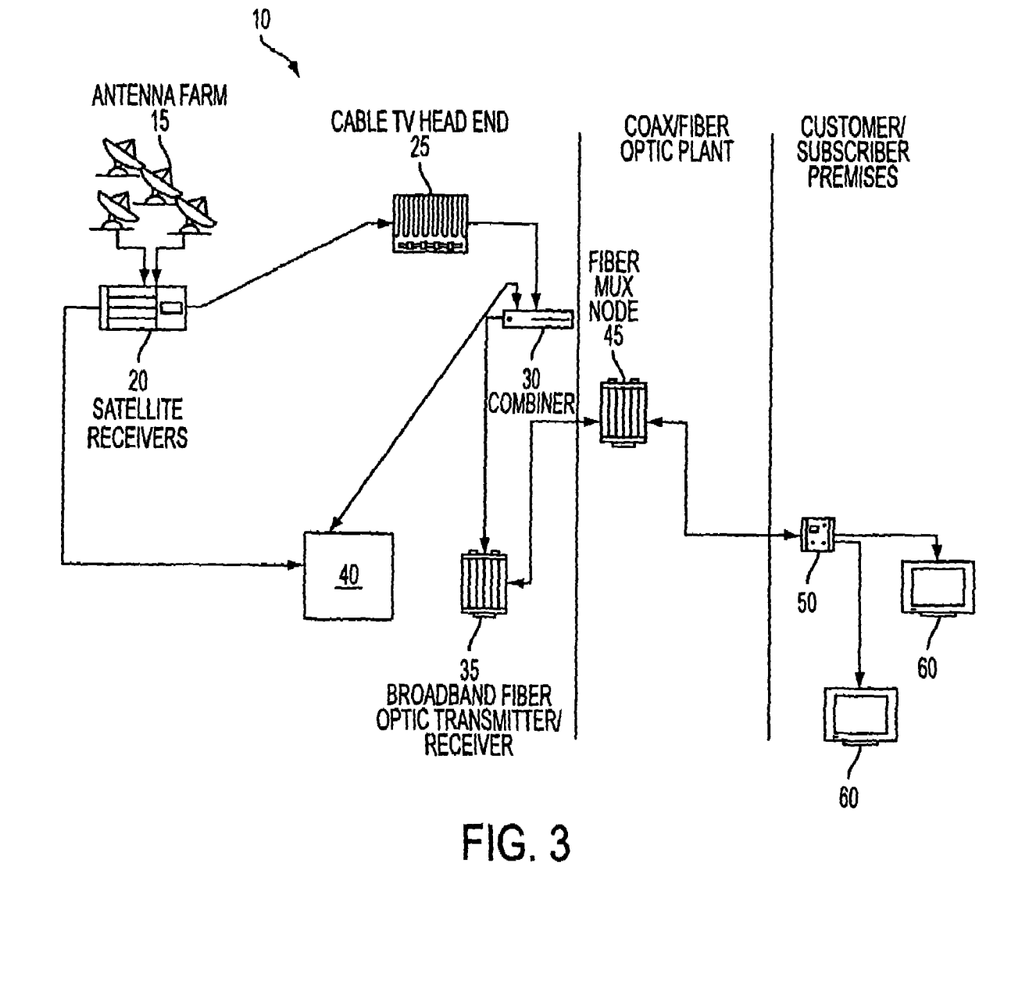
FIG. 3 is a schematic illustration of one embodiment of an ultra-wideband communication system employing a wired medium.
Figure 4:
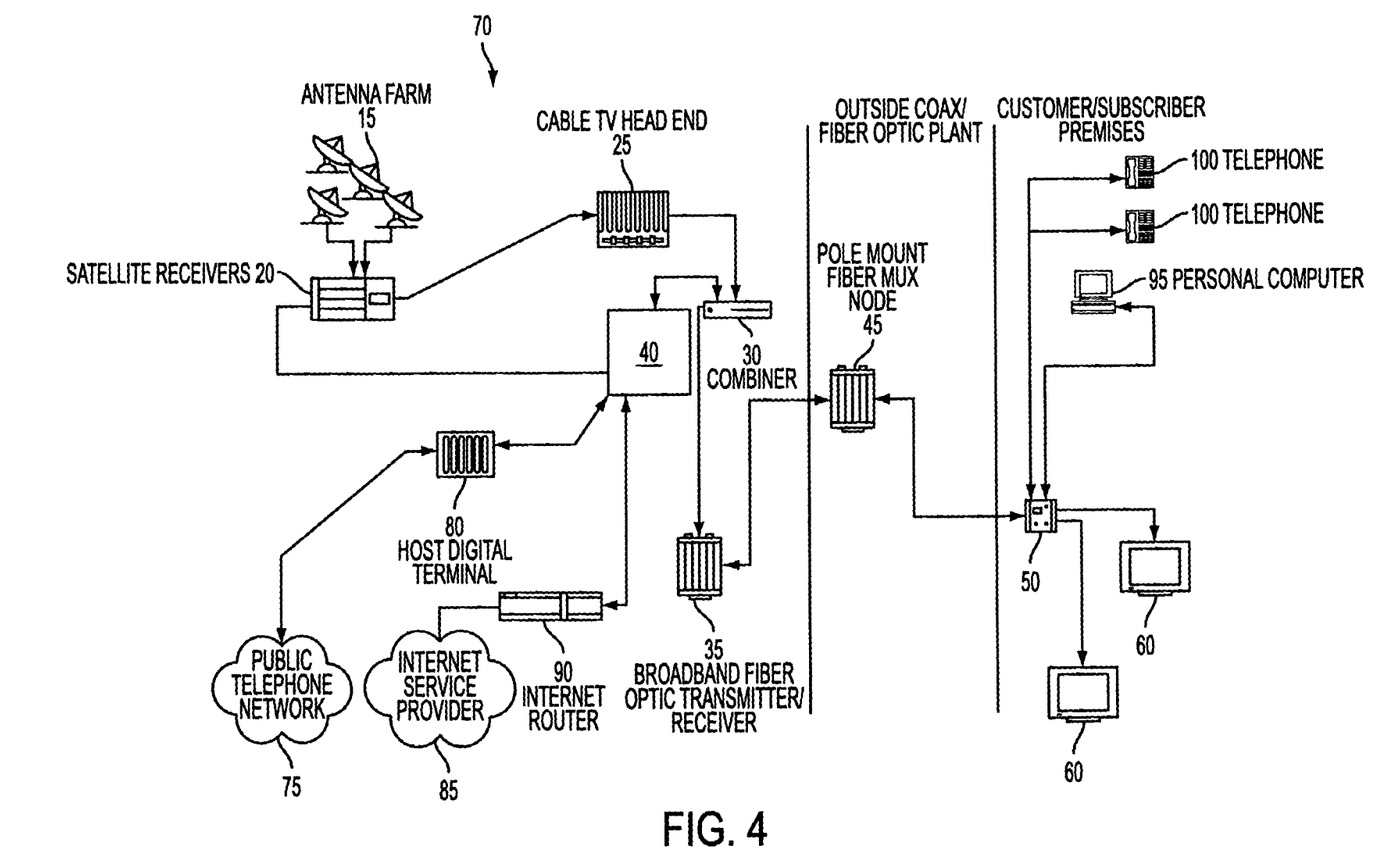
FIG. 4 is a schematic illustration of a second embodiment of an ultra-wideband communication system employing a wired medium.

The present invention provides an apparatus and method to enable any wired media network to augment their available bandwidth. Preferably, this additional bandwidth is obtained by introducing UWB signals into the existing data transmission chain prior to broadcast from the system operator's head-end. As shown in FIGS. 3 and 4, the head-end may include several components, such as the antenna farm 15, the satellite receivers 20, the channel modulator 25, the combiner 30, and the fiber optic transmitter/receiver 35. Alternatively, UWB signals may be introduced into the wired media network at other locations, such as at the Internet router 90 or at the host digital terminal 80, or at any other suitable location.

In like fashion, cable system operators can receive more data from individual subscribers by introducing subscriber-generated data into existing upstream channels. The present invention provides UWB communication across fiber optic and coaxial cable, twisted pair wires, or any other type of conductive wire. A wired media network will be able to both transmit and receive digital information for the purposes of telephony, high-speed data, video distribution, video conferencing, wireless base operations and other similar purposes.

Referring to FIG. 3, the wired ultra-wideband communication system 10 is configured to transmit ultra-wideband signals over an existing network or system that includes wired media. For example, the wired ultra-wideband (UWB) system 10 may transmit UWB signals over an existing community access television network (CATV), an optical network, a cable television network, a community antenna television network, a hybrid fiber-coax television network, an Internet service provider network, a PSTN network, a WAN, LAN, MAN, TCP/IP network, a college campus, town, city, or any other type of network as defined above, that employs wired media, in whole or in part.

One embodiment of the wired UWB communication system 10 is illustrated in FIG. 3. An antenna farm 15 receives audio, video and data information from one or more satellites (not shown). Additional data may be received by terrestrial cables and wires, and by terrestrial wireless sources, such as a multichannel multipoint distribution service (MMDS). The data is then forwarded to the satellite receivers 20 that demodulate the data into separate audio, video and data streams. This information is forwarded to the channel modulators 25 that receive the program signals, such as CNN or MTV. The channel modulators 25 mix each signal with a radio frequency (RF) and assign a station number (such as 2 to 99) that each program will be received on by subscribers.

The multiple RF signals are then forwarded to a combiner 30 that combines the multiple signals into a single output. That is, the combiner 30 receives the program signals from the channel modulators 25 and combines them onto a single coax cable and forwards the signal to the fiber optic transmitter/receiver 35. The above-described arrangement and function of channel modulators 25 and combiners 30 may vary with each type of wired media network.

Additional audio, video, or other data signals received from either the antenna farm 15 or from terrestrial sources such as fiber optic or coaxial cables can be routed from the satellite receiver 20 to the service provider ultra-wideband (UWB) device 40. The service provider UWB device 40 converts the audio, video, or other data signals received from the satellite receiver 20 into a multiplicity of UWB electromagnetic pulses. The service provider ultra-wideband (UWB) device 40 may include several components, including a controller, digital signal processor, an analog coder/decoder, one or more devices for data access management, and associated cabling and electronics. The service provider ultra-wideband (UWB) device 40 may include some, or all of these components, other necessary components, or their equivalents. The controller may include error control, and data compression functions. The analog coder/decoder may include an analog to digital conversion function and vice versa. The data access management device or devices may include various interface functions for interfacing to wired media such as phone lines and coaxial cables.

The digital signal processor in the service provider ultra-wideband (UWB) device 40 modulates the audio, video, or other data signals received from the satellite receiver 20 into a multiplicity of UWB electromagnetic pulses, and may also demodulate UWB pulses received from the subscriber. As defined herein, modulation is the specific technique used to encode the audio, video, or other data into a multiplicity of UWB pulses. For example, the digital signal processor may modulate the received audio, video, or other data signals into a multiplicity of UWB pulses that may have a duration that may range between about 0.1 nanoseconds to about 100 nanoseconds, and may be transmitted at relatively low power, for example, at less than −30 power decibels to −60 power decibels, as measured across the transmitted frequency.

The UWB pulse duration and transmitted power may vary, depending on several factors. Different modulation techniques employ different UWB pulse timing, durations and power levels. The present invention envisions several different techniques and methods to transmit an UWB signal across a wired medium. One embodiment, may for example, use pulse position modulation that varies the timing of the transmission of the UWB pulses. One example of a pulse position modulation system may transmit approximately 10,000 pulses per second. This system may transmit groups of pulses 100 picoseconds early or 100 picoseconds late to signify a specific digital bit, such as a "0" or a "1". In this fashion a large amount of data may be transmitted across a wired medium. Alternatively, the UWB signal may be transmitted in a fashion similar to that described in U.S. patent application entitled, "ENCODING AND DECODING ULTRA-WIDEBAND INFORMATION," Ser. No. 09/802,590 (in the name of John H. Santhoff and Rodolfo T. Arrieta), which is referred to and incorporated herein in its entirety by this reference.

An alternative modulation technique may use pulse amplitude modulation to transmit the UWB signal across a wired medium. Pulse amplitude modulation employs pulses of different amplitude to transmit data. Pulses of different amplitude may be assigned different digital representations of "0" or "1." Other envisioned modulation techniques include On-Off Keying that encodes data bits as pulse (1) or no pulse (0), and Binary Phase-Shift Keying (BPSK), or bi-phase modulation. BPSK modulates the phase of the signal (0 degrees or 180 degrees), instead of modulating the position. Spectral Keying, which is neither a PPM nor PAM modulation technique may also be employed. It will be appreciated that other modulation techniques, currently existing or yet to be conceived, may also be employed.

A preferred modulation technique will optimize signal coexistence and pulse reliability by controlling transmission power, pulse envelope shape and Pulse Recurrent Frequencies (PRF). Both pseudo-random and fixed PRFs may be used, with the knowledge that a fixed PRF may create a "carrier-like frequency," which it and its higher order harmonics may interfere with the data carried in conventional RF carrier channels. However, with a pseudo-random PRF the difficulties encountered with a fixed PRF are usually avoided. One embodiment of a pseudo-random PRF modulation technique may include a UWB pulse envelope that is shaped to pre-amplify and compensate for high frequency components that the wired media may naturally attenuate. UWB pulse envelope shaping has the additional advantage of controlling the power spectral density of the transmitted data stream.

Several advantages exist when transmitting UWB pulses through wired media as opposed to transmitting UWB pulses through a wireless medium. Wireless UWB transmissions must consider such issues as Inter-Symbol Interference (ISI) and Multi-User Interference (MUI), both of which can severely limit the bandwidth of UWB transmissions. Some modulation techniques such as Pulse Amplitude Modulation (PAM), which offer the ability for high bit densities are not effective at long wireless distances. These, and other issues, do not apply to UWB pulses transmitted over wired media.

In addition, no multipath issues arise and there are no propagation delay problems present in a wired medium. Therefore, it is estimated that an ultra-wideband system may be able to transmit data across a wired medium in a range from 100 Mbit/second to 1 Gbit/second. This data rate will ensure that the bandwidth requirements of any service provider can be met.

A preferred embodiment of the service-provider UWB device 40 will spread the signal energy of the UWB data stream across the a bandwidth that may ranger from 50 MHz to approximately 870 MHz or as discussed above, to 1 GHz, or higher. This will ensure that the signal energy present at any frequency is significantly below the normal noise floor for that frequency band, further ensuring coexistence with conventional RF carrier data.

For example, a UWB pulse would have a duration of about 1 nano-second in a UWB data stream that has a 1 GHz bandwidth. Alternatively, the UWB pulse duration would be tailored to match the available frequency of the specific network. For a CATV or HFCS network located in the United States, an ideal UWB pulse would generally be about 0.5 to 2 nano-seconds in duration. This is because a conventional CATV or HFCS network located in the United States typically utilizes a maximum frequency of approximately 870 MHz, but has the capacity to utilize up to 1 GHz. This bandwidth allows for a 1 to 2 nano-second pulse duration. A narrow pulse width is preferred because more pulses can be transmitted in a discrete amount of time. Pulse widths of up to 2 nano-seconds may be employed to guarantee pulse integrity throughout digitization, transmission, reception and reformation at the UWB subscriber device 50. Generally, an idealized pulse width would be calculated based on the frequency response of the specific wired media system.

Referring to FIG. 3, the multiplicity of generated UWB pulses are sent from the service-provider UWB device 40 to the combiner 30, which combines the UWB pulses with the conventional RF carrier signals. One method to accomplish this task is to couple a wire carrying the conventional RF carrier signals to a standard coaxial splitter. A second wire carrying the UWB pulses is also coupled to the standard coaxial splitter. The combined signals are forwarded to the fiber optic transmitter/receiver 35. The fiber optic transmitter/receiver 35 converts both the multiplicity of UWB pulses and the conventional RF carrier signals received from the combiner 30 into a corresponding optical signal. The optical signal generator can be either a light-emitting diode, solid state laser diode, or other suitable device. The optical signal is then distributed on fiber optic cables to residential neighborhoods, business districts, universities, colleges or other locations for distribution to subscribers and customers. Other methods and techniques for combining a UWB pulse stream and a conventional RF carrier signal stream may also be employed. For example, the UWB pulse stream my be sent directly to the fiber optic transmitter/receiver 35, which will then combine the two signals.

Shown in FIG. 3, a fiber multiplexer node 45 may be located at any one of the locations described above. The optical signals are received by the multiplexer 45 and are converted back to the combined conventional RF carrier and UWB pulsed signals. The combined signals are forwarded to a subscriber UWB device 50. The subscriber UWB device 50 can be considered a gateway or router that provides access to the combined signals.

One embodiment of the subscriber UWB device 50 will demodulate the multiplicity of UWB electromagnetic pulses back into a conventional RF carrier signal. The subscriber UWB device 50 may include all, some or additional components found in the service provider UWB device 40. In this manner, additional bandwidth will be available to the wired media network to provide the additional data and functionality demanded by the customer.

An alternative embodiment of the present invention is illustrated in FIG. 4. A full service wired UWB communication system 70 is structured to allow for extremely high data rate transmission of video, telephone, internet and audio signals.

The full service UWB system 70 receives audio, video and data information from an antenna farm 15 or from terrestrial sources such as fiber optic or coaxial cables. These signals are forwarded to the satellite receivers 20 as described above with reference to the wired UWB communication system 10. In addition, signals from a public telephone network 75 are received by a host digital terminal 80. The host digital terminal 80 modulates multiple voice signals into two-way upstream and downstream RF signals. The voice signals from the host digital terminal 80 are forwarded to the service provider UWB device 40.

An internet service provider 85 forwards internet data to the internet router 90. The internet router 90 generates packets, such as TCP/IP packets, which are forwarded to the service provider UWB device 40.

The service provider UWB device 40 modulates the internet data, the telephony data and the data received from the satellite receivers 20 into a multiplicity of electromagnetic pulses, as described above, and forwards the pulses to the combiner 30. The combiner combines the UWB pulses with the conventional RF carrier signals and forwards the combined signal to the fiber optic transmitter/receiver 35. The signals are then converted into an optical signal by either a light emitting diode, solid state laser diode, or other suitable device. The optical signal is then distributed to the fiber multiplexer node 45 located within business districts, residential neighborhoods, universities, colleges and other areas.

The fiber multiplexer node 45 receives the fiber optic signal and converts them back to the combined conventional RF carrier and UWB pulsed signals. The combined signals are forwarded to a subscriber UWB device 50. The subscriber UWB device 50 can be considered a gateway or router that provides access to the combined signals. The subscriber UWB device 50 demodulates the multiplicity of UWB electromagnetic pulses into RF signals and forwards the RF signals to appropriate locations such as televisions, personal computers or telephones. Alternative embodiment subscriber UWB devices 50 may be located adjacent to televisions sets similar to a set-top box and used to transmit on-demand movies, internet access or pay-per-view programs. Yet another embodiment of the present invention may include a UWB device 50 that may be located within a television set, or computer. The UWB device 50 is constructed to convert and distribute data to computers, network servers, digital or subscription televisions, interactive media devices such as set-top boxes and telephone switching equipment.

The subscriber UWB device 50 may also be configured to transmit UWB pulses wirelessly to provide audio, video, and other data content to personal computers, televisions, PDAs, telephones and other devices. For example, UWB device 50 may include the necessary components to transmit and receive UWB or conventional RF carrier signals to provide access to interfaces such as PCI, PCMCIA, USB, Ethernet, IEEE1394, or other interface standards.

The present invention will also allow for data to be transmitted "upstream" toward the service provider. For example, a conventional CATV or HFCS network reserves frequencies below 50 MHz for upstream traffic. One embodiment of the present invention may include a bandpass filter with stop-bands above 1 GHz, and below 50 MHz to ensure attenuation of UWB pulses so as not to interfere with upstream traffic. These filters also serve the purpose of limiting potential inter-modulation distortion that could be introduced by the UWB pulses.

Alternative embodiments of the present invention may transmits UWB pulses through traditional telephone wires. Depending upon the provider, whether they be a local or long distance carrier, an UWB transmitter/receiver can be located in a regional center, sectional center, primary center, toll center, end-office, or their equivalents.

The present invention of transmitting ultra-wideband signals across a wired medium can employ any type of wired media. For example, the wired media can include optical fiber ribbon, fiber optic cable, single mode fiber optic cable, multi-mode fiber optic cable, plenum wire, PVC wire, and coaxial cable.

In addition, the wired media can include twisted-pair wiring, whether shielded or unshielded. Twisted-pair wire may consist of "pairs" of color-coded wires. Common sizes of twisted-pair wire are 2 pair, 3 pair, 4 pair, 25 pair, 50 pair and 100 pair. Twisted-pair wire is commonly used for telephone and computer networks. It comes in ratings ranging from category 1 to category 7. Twisted-pair wiring also is available unshielded. That is, the wiring does not have a foil or other type of wrapping around the group of conductors within the jacket. This type of wiring is most commonly used for wiring for voice and data networks. The foregoing list of wired media is meant to be exemplary, and not exclusive.

As described above, the present invention can provide additional bandwidth to enable the transmission of large amounts of data over an existing wired media network, whether the wired media network is a Internet service provider, cable television provider, or a computer network located in a business or university. The additional bandwidth can allow consumers to receive the high speed Internet access, interactive video and other features that they are demanding.

Referring now to FIGS. 5–8, another embodiment of the present invention is illustrated. This embodiment provides ultra-wideband (UWB) communications over wire media that provide electrical power. In one embodiment of this aspect of the present invention, an UWB enabled power supply source, such as a power strip, or other type of power supply device can power consumer devices. Devices powered by this UWB enabled power supply source can communicate with other devices that are commonly powered by the power supply source. One feature of this embodiment is that power line filtering may be employed to reduce the inherent noise within the power supply source. Additionally, with the use of power-line filters, UWB pulse content can be isolated to within the power supply source.

One feature of this embodiment is that it employs UWB technology to overcome some of the limitations inherent in conventional power line communication (PLC) systems. As discussed above, the present invention transmits a time domain pulse or signal that distributes the signal energy relatively evenly throughout the entire spectrum of the medium. However, unlike spread spectrum technologies such as frequency division multiplexing (FDM) and orthogonal frequency division multiplexing (OFDM), the spectral density of UWB is extremely low. Like other spread-spectrum technologies this enhances the noise immunity of the transmission, increasing signal reliability. Unlike other spread-spectrum technologies, avoidance of other frequencies of transmission is unnecessary. One feature of this embodiment of the present invention includes methods of communication based on the inherent distortion effects of the media.

This embodiment of the present invention may be employed in any type of network, as defined above, that uses electrical power lines, be it wireless, wired, or a mix of wire media and wireless components. The present invention dramatically increases the bandwidth of conventional networks that employ wire media, but can be inexpensively deployed without extensive modification to the existing wire media network.

A central facet of any data communications system is the reliability and integrity of the data that is being communicated. Ideally, the data that is transmitted from the transmitting location should be identical to the data that is received at the receiving location. Practically however, the data that is received at the receiving location is oftentimes corrupted. Data corruption, or other data communication errors may be attributed to the transmission equipment, and/or the transmission medium and/or the receiving equipment. With respect to the transmission medium, data errors are usually attributed to the characteristics associated with the particular transmission medium.

For example, the transmission of data over wire media generally suffers from noise and attenuation phenomena. Specifically, when an alternating current (AC) power line is used as the transmission medium, this type of medium generally exhibits unpredictable transmission characteristics such as extreme attenuation at certain frequencies, phase changes along the transmission route, notches (dips in frequency response) and discontinuities (changes in impedance).

Generally, there are three modes of noise most common: Gaussian noise, low voltage impulsive interference, and very high voltage spikes. Of these three, the low voltage impulsive interference tends to be the predominant cause of data transmission errors. Therefore, data transmission may be reliably accomplished though power lines even in the presence of Gaussian noise. As for high voltage spikes, they are relatively infrequent and invariably cause data errors, with error detection/retransmission (ACK/NACK) being commonly recognized as the best method of recovering the lost information. Furthermore, these characteristics may vary significantly as the electrical power load conditions on the line vary. For example, such electrical load variation may be caused by power draw from virtually any type of electrical device, such as industrial machines, electric motors in household and commercial appliances, light dimmer circuits, heaters, battery chargers, computers, video monitors, audio equipment, and any other device that requires electricity to operate.

Generally, different types of data transmission formats are susceptible to different types of attenuation and distortion. Narrowband transmission formats such as frequency shift keying (FSK) or amplitude shift keying (ASK) are somewhat immune to frequency dependent attenuation, and thus may suffer little or no distortion. However, the entire narrowband signal may fall into an attenuation null and be severely attenuated. Wideband transmission formats such as spread spectrum are less susceptible to the signal degradation caused by narrowband attenuation null. However, due to the wider bandwidth associated with a spread spectrum signal, the spread spectrum signal experiences more distortion due to frequency dependent attenuation. Thus, a conventional narrowband signaling format is susceptible to attenuation while a conventional wideband signaling format is susceptible to distortion.

Another technique employed in Power Line Communications (PLC) is the use of orthogonal frequency division multiplexing (OFDM). Orthogonal frequency-division multiplexing (OFDM) is a method of digital modulation in which a signal is split into several narrow band channels at different frequencies. The standard approach to OFDM is to use the same data allocation to all frequencies, similar to the IEEE 802.11 a standard. However, this type of data allocation scheme is undesirable in power line media since some frequencies are severely attenuated. A conventional fix to this problem is to allow the transmitter and receiver to adapt to the characteristics of the channel. But this approach dramatically increases the complexity and cost of this form of communication.

Yet another method for transmitting data through power lines is frequency division multiplexing (FDM) and time division multiplexing (TDM). One feature of the present invention is that ultra-wideband (UWB) pulses, or signals can co-exist with either the OFDM or the FDM/TDM approach, thereby increasing the bandwidth of the communication system.

For UWB to be useful in a PLC system, the UWB datastream should be reliably transmitted and recovered. Additionally, the UWB signal, or pulses should peacefully coexist within the existing spectral content on the system.

In one embodiment of the present invention, ultra-wideband pulses may generally have a duration of about 1 nano-second. Although they may range in duration from about 0.1 to about 100 nano-seconds, a preferred range may be between about 0.5 to about 2 nano-seconds in duration. The current allocations by the two European standards organizations (ETSI and Cenelec) show utilization of a maximum frequency of approximately 30 MHz in a power line. This bandwidth allows for a 33 nano-second pulse duration. Generally, a short UWB pulse duration is preferred since more UWB pulses can be transmitted in a discrete amount of time. However, UWB pulse duration may have to be expanded up to about 40 to 50 nano-seconds to ensure pulse integrity throughout digitization, transmission, reception and reformation at the receiver. In a preferred embodiment, the ideal UWB pulse duration may be calculated based on the frequency response of the media to maintain signal integrity.

On feature of the present invention is that signal coexistence and pulse reliability may be optimized by controlling transmission power, pulse envelope shape and the pulse recurrence frequency (PRF). A fixed PRF may be used, but care needs to be exercised in selecting the transmission rate to avoid establishing a "carrier" like frequency which it and its higher order harmonics may cause interference with data carried in other frequency channels. With a psudo-random PRF some of the difficulties encountered with a fixed PRF are avoided but the complexity of the communications device is generally increased. One feature of the present invention is that the UWB pulse envelope is shaped to pre-amplify and compensate for high frequency components that the transmission media may naturally attenuate. Pulse envelope shaping has the additional advantage of controlling the power spectral density of the transmitted data stream. The UWB pulse amplitude may also be optimized to ensure reliable UWB pulse transmission through the communication system.

Another feature of the present invention is that spreading the signal energy of the UWB data stream across the available bandwidth (which may be greater than or less than 30 MHz) generally ensures that the signal energy present at any frequency is below the noise floor for that frequency band, which further ensures coexistence with data signals that may be present.

Wire media such as electrical power lines provides an ideal environment for bandwidth optimization. In wireless media such issues as multi-path interference (MPI), and multi-user interference (MUI) must be addressed and can severely limit the bandwidth of UWB transmissions. In addition, some modulation techniques such as pulse amplitude modulation (PAM), which offer the ability for high bit densities, are not effective at long ranges. Some of these characteristics do not apply to UWB transmitted through wire media. By employing a combination of PAM and PPM high data rates can be achieved by encoding a multiplicity of bits per symbol.

Figure 5:
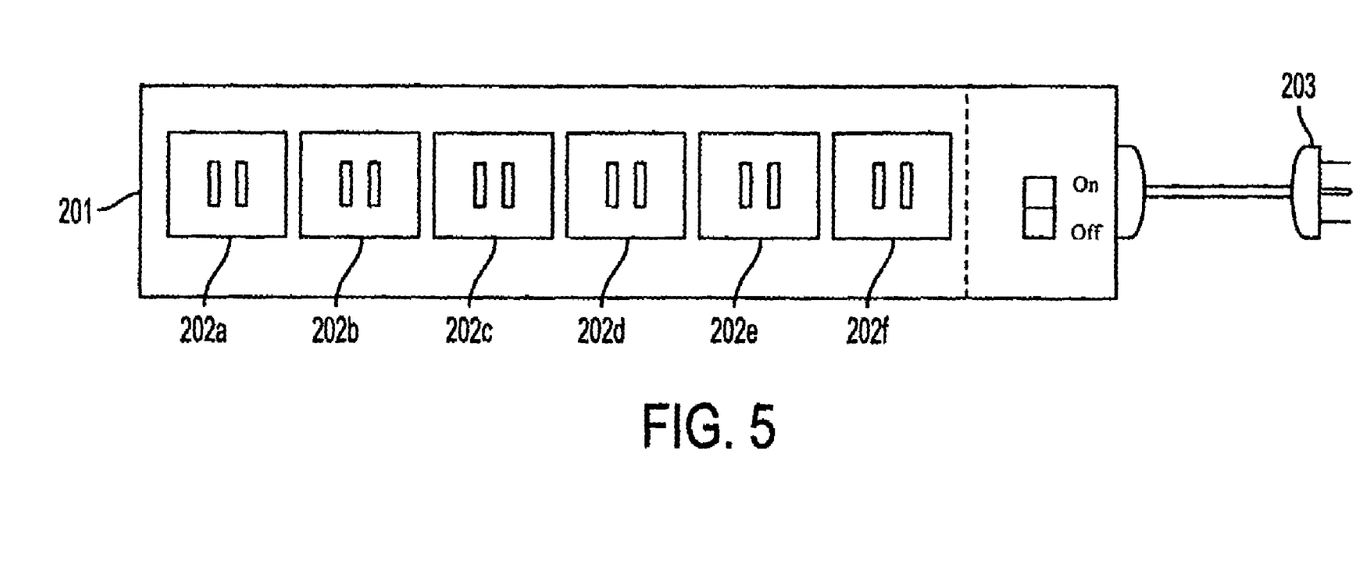
FIG. 5 is an illustration of a power supply constructed according to one embodiment of the present invention.

Referring now to FIG. 5, in this embodiment of the present invention ultra-wideband (UWB) communications occur between devices that share a common power supply source, or power strip 201. It will be appreciated that the common power supply source may include the wiring and associated electrical power outlets in a home, business, university, hospital or other structure. Moreover, the common power supply source may be any other type of electrical power supply, such as a battery powered device that provides electric power to one or more UWB enabled devices.

One feature of the present invention is that UWB enabled devices receive power from, and communicate with, each other through power outlet plugs 202 a–f. UWB enabled devices are devices that include UWB communications technology, and may include devices such as a phone, a personal digital assistant, a portable computer, a laptop computer, any network as described above (LAN, WAN, PAN etc.), video monitors, computer monitors, or any other device employing UWB technology.

Figure 6:
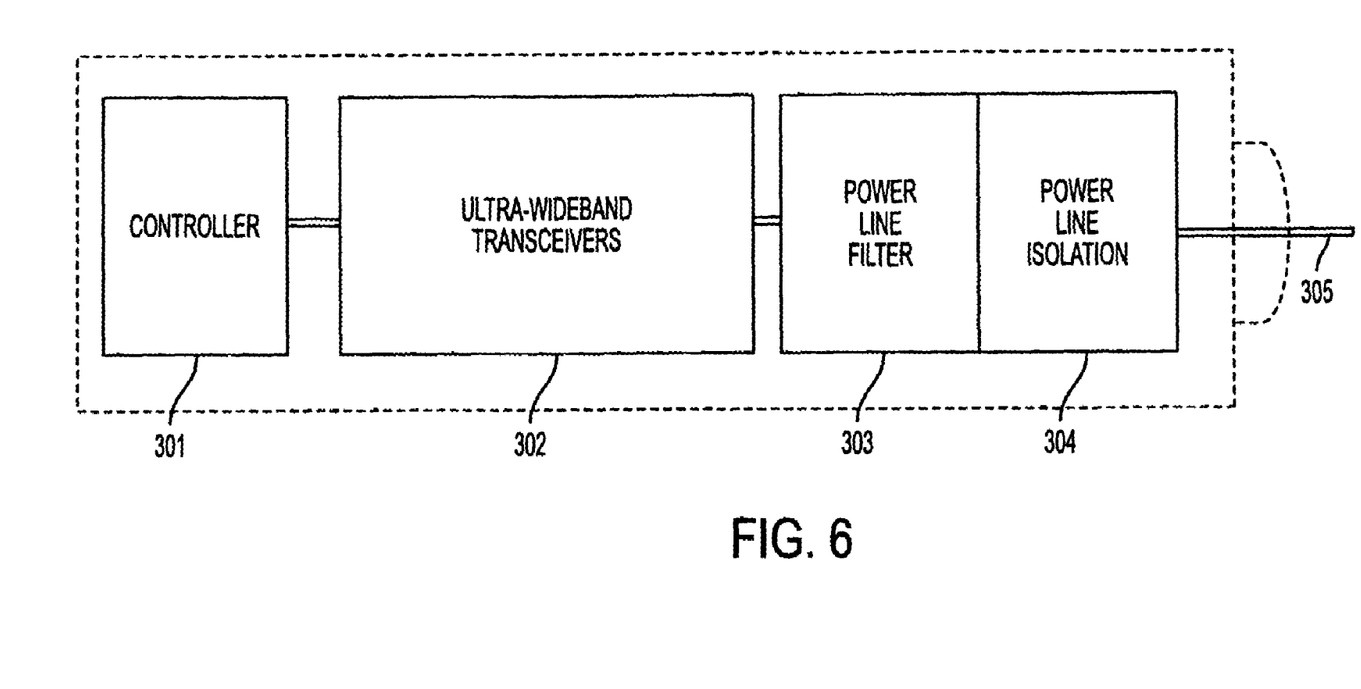
FIG. 6 is a schematic illustration of some of the components included in the power supply illustrated in FIG. 5.

In the embodiment illustrated in FIG. 6, power line filters may be employed to filter noise and other types of power line communications from the external power line. Additionally, Ultra-Wideband communications can be prevented from reaching the external power distribution system through plug 203. Since the UWB pulses can be isolated from the rest of the power distribution, increased UWB power levels can be employed. This embodiment has the advantage of increased data rates between devices connected to the strip. But is limited to the number of communicating devices in that a common UWB power strip must power each communicating device.

Referring now to FIG. 6, some of the components of the power strip 201 are illustrated. External power is supplied to the power strip 201 through cable 305 that obtains electrical power from an electrical power outlet, or may be wired directly to an electrical power source. Isolator 304 blocks other forms of power line communications from entering the power strip 201. In one embodiment, the isolator is a bandpass filter with a center frequency of about 60 Hz. The filter rejects, or blocks ultra-wideband pulse content that is outside of the pass band of the filter. Additionally, the isolator 304 blocks the transmission of ultra-wideband pulses to the power source. Since most power sources, such as state or city electrical power distribution systems are inherently noisy, filter 303 is employed to filter the noise from the incoming electrical power. The filter 303 may be a band-rejection filter, bandpass filter, highpass filter, lowpass filter or other suitable filter. The transceiver, or transceivers 302, transmit and receive data to and from the devices connected to the power strip. The transceiver 302 may be a transmitter-receiver containing separate components, or it may be an integrated transceiver that may include a pulse detector, a data modulation unit, a data demodulation unit, one or more filters, one or more amplifiers, and other components that enable the transmission and reception of ultra-wideband pulses. Another embodiment of the power strip 201 may include a controller 301 that may perform functions such as routing and signal input and output (I/O) control. The controller 301 may include a digital computer that may contain computer logic or software to perform the I/O functions.

Figure 7:
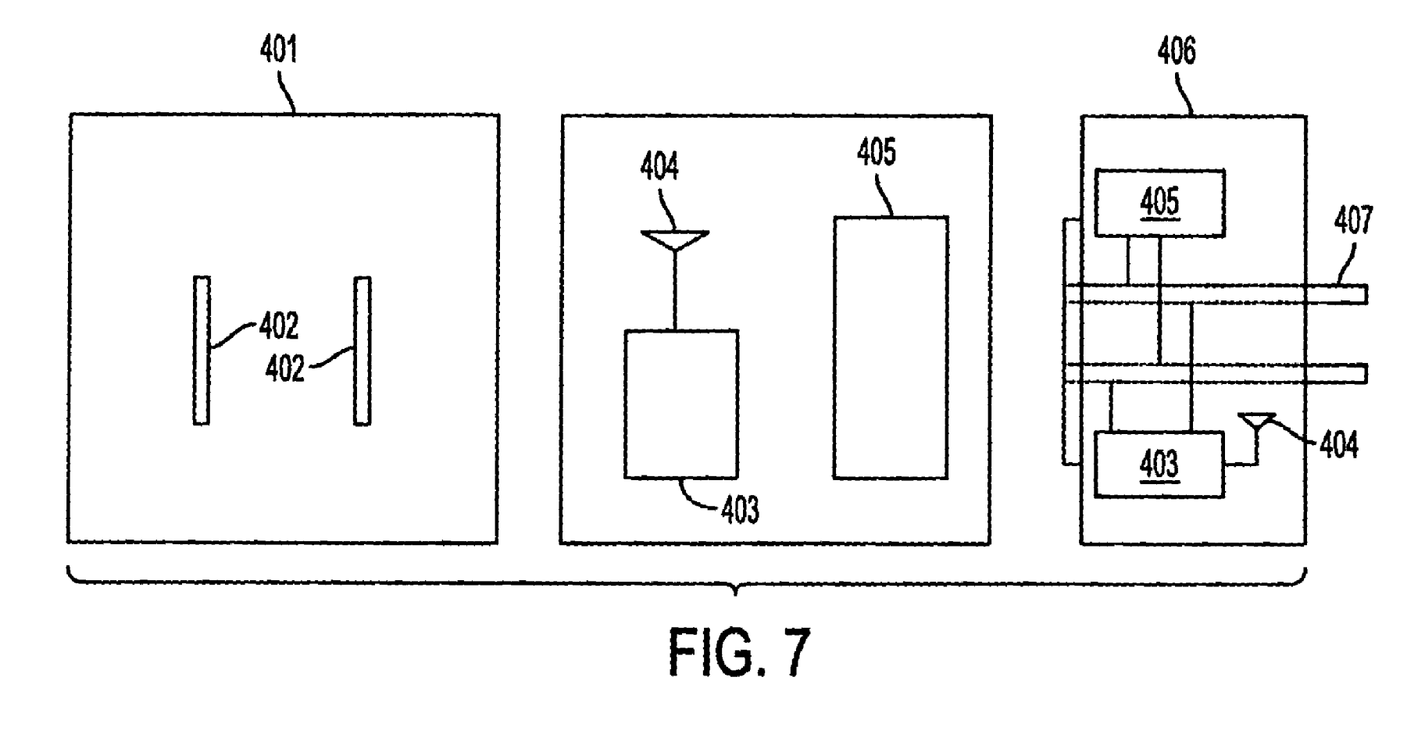
FIG. 7 is a front view, side view and internal schematic illustration of another embodiment of a power supply constructed according to the present invention.

Referring now to FIG. 7, another embodiment of the present invention is illustrated. In this embodiment, UWB pulses or signals may travel throughout the power lines in a structure. Thus, the UWB pulses may not be isolated from the structure's power source. Alternatively, a UWB isolator, similar to the isolator 304 described above, may be positioned at a main power transfer location for the structure, and thereby isolate the UWB pulses from the power source, such as a state or city electrical power line. The structure in this case may be a home, business, university, hospital or any other structure that employs or has a need for electrical power.

In the embodiment shown in FIG. 7, a plug-in ultra-wideband (UWB) transceiver 401 may be employed in any room, or other area of the structure that has electrical power outlets (not shown). The plug-in transceiver 401 is removably coupled to the electrical power outlet by male connectors 407. The male connectors 407 may be electrically conductive pins or plugs, and they may be sized and configured to fit female power outlets of any configuration. For example, the male connectors 407 may be sized to fit a 110 volt, 3-slot power female outlet; a 110 volt, 2-slot female power outlet; a 220 volt, 240 volt or greater voltage female power outlet that may be configured for Continental Europe, Japan, or any other country.

An UWB enabled device (not shown) is then removably coupled to the plug-in UWB transceiver 401 though female slots 402. The female slots 402 may be sized and configured to receive any arrangement of male pins or plugs. In this fashion, the plug-in transceiver 401 allows the UWB enabled device to obtain electrical power from the structure's power outlets.

In addition, the plug-in UWB transceiver 401 allows an UWB enabled device that is plugged into connectors 407 to communicate with other UWB devices through the structure's power lines. Alternatively, a UWB enabled device may receive wireless UWB pulses, or signals through the plug-in UWB transceiver 401. In this embodiment, the plug-in UWB transceiver 401 may function as a communications bridge, by forwarding wireless UWB pulses, or signals through the power line to the UWB enabled device that is coupled to the plug-in UWB transceiver 401.

As shown in FIG. 7, the plug-in UWB transceiver 401 includes an ultra-wideband wire media transceiver 405. A wireless-capable plug-in UWB transceiver 401 may include a wireless transceiver 403 that has an ultra-wideband antenna 404. Alternatively, the plug-in UWB transceiver 401 may have a single transceiver (not shown) that includes an ultra-wideband antenna 404, with the single transceiver constructed to transmit and receive both wired and wireless UWB pulses, or signals. The single transceiver, wire media transceiver 405, and the wireless transceiver 405 may be constructed like the transceiver 302, shown in FIG. 6.

Thus, it is seen that an apparatus and method for transmitting and receiving ultra-wideband signals through a wire medium is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. An electric power supply for communication through an electric power wire, comprising:
    at least one electric power outlet structured to provide electric power from the electric power wire;
    an ultra-wideband transmitter communicating with the electric power wire and with the at least one electric power outlet; and
    an ultra-wideband receiver communicating with the electric power wire and with the at least one electric power outlet.

2. The electric power supply of claim 1, wherein the electric power supply provides an ultra-wideband communication to at least two devices that are coupled to the electric power supply.

3. The electric power supply of claim 2, wherein one of the at least two devices is directly coupled to the at least one electric power outlet, and the other device is remotely coupled to the electric power supply through the electric power wire.

4. The electric power supply of claim 1, wherein the electric power supply comprises an electric power strip that includes at least two electric power outlets.

5. The electric power supply of claim 1, wherein the electric power supply provides an ultra-wideband communication to other electric power supplies through the electric power wire.

6. The electric power supply of claim 1, wherein the electric power outlet is sized to receive a male connector that provides electric power to a device.

7. The electric power supply of claim 6, wherein the male connector comprises at least two electrically conductive pins.

8. The electric power supply of claim 2, wherein the device is ultra-wideband enabled and is selected from a group of consisting of: a phone, a personal digital assistant, a portable computer, a laptop computer, a network, a video monitor, a computer monitor, a home appliance, an office appliance, and a device employing ultra-wideband technology.

9. The electric power supply of claim 1, wherein the transmitter can transmit ultra-wideband signals though a wire medium or a wireless medium.

10. The electric power supply of claim 1, wherein the receiver can receive ultra-wideband signals though a wire medium or a wireless medium.

11. The electric power supply of claim 1, wherein the ultra-wideband transmitter comprises an ultra-wideband pulse modulator that is structured to transmit a multiplicity of ultra-wideband pulses.

12. The electric power supply of claim 1, wherein the ultra-wideband receiver comprises an ultra-wideband pulse demodulator that is structured to receive a multiplicity of ultra-wideband pulses.

13. The electric power supply of claim 1, wherein a plurality of ultra-wideband pulses are transmitted and received, and each ultra-wideband pulse comprises a pulse of electro magnetic energy having duration between about 0.1 nanosecond and about 1 millisecond.

14. The electric power supply of claim 13, wherein the plurality of ultra wideband pulses is transmitted at a power level ranging between about +30 power decibels, to about −140 power decibels, as measured at a single frequency.

15. An electric power supply structured to transmit a plurality of ultra-wideband pulses through an electric power medium, comprising:
    at least one electric power outlet structured to provide electric power from the electric power medium;
    an ultra-wideband transmitter communicating with the electric power medium and with the at least one electric power outlet; and
    an ultra-wideband receiver communicating with the electric power medium and with the at least one electric power outlet.

16. The electric power supply of claim 15, wherein the plurality of ultra-wideband pulses each comprise a pulse of electro magnetic energy having duration between about 0.1 nanosecond and about 1 millisecond.

17. The electric power supply of claim 15, wherein the plurality of ultra wideband pulses is transmitted at a power level ranging between about +30 power decibels, to about −140 power decibels, as measured at a single frequency.

18. The electric power supply of claim 15, wherein the ultra-wideband transmitter comprises an ultra-wideband pulse modulator that is structured to transmit a multiplicity of ultra-wideband pulses.

19. The electric power supply of claim 15, wherein the ultra-wideband receiver comprises an ultra-wideband pulse demodulator that is structured to receive a multiplicity of ultra-wideband pulses.

20. The electric power supply of claim 15, wherein the electric power medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

21. The electric power supply of claim 15, wherein the plurality of ultra-wideband pulses is used to transmit data selected from a group consisting of: telephony data, high-speed data, digital video data, digital television data, Internet communication data and audio data.

22. The electric power supply of claim 15, wherein the plurality of ultra-wideband pulses are selected from a group consisting of: a pulse quadrature amplitude modulated pulse, a pulse position modulated pulse, a pulse amplitude modulated pulse, a pulse transmitted at a fixed pulse rate, a pulse transmitted at a variable pulse rate, and a pulse transmitted at a pseudo-random pulse rate.

23. An ultra-wideband communication system structured to transmit a plurality of ultra-wideband pulses through an electric power medium, comprising:
    an ultra-wideband transmitter comprising at least one electric power outlet, the ultra-wideband transmitter structured to transmit the plurality of ultra-wideband pulses through the electric power medium; and an ultra-wideband receiver structured to receive the plurality of ultra-wideband pulses from the electric power medium.

24. The ultra-wideband communication system of claim 23, wherein the plurality of ultra-wideband pulses each comprise a pulse of electro magnetic energy having duration between about 0.1 nanosecond and about 1 millisecond.

25. The ultra-wideband communication system of claim 23, wherein the plurality of ultra wideband pulses is transmitted at a power level ranging between about +30 power decibels, to about −140 power decibels, as measured at a single frequency.

26. The ultra-wideband communication system of claim 23, wherein the electric power medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

27. The ultra-wideband communication system of claim 23, wherein the plurality of ultra-wideband pulses is used to transmit data selected from a group consisting of: telephony data, high-speed data, digital video data, digital television data, Internet communication data and audio data.

28. The ultra-wideband communication system of claim 23, wherein the plurality of ultra-wideband pulses are selected from a group consisting of: a pulse quadrature amplitude modulated pulse, a pulse position modulated pulse, a pulse amplitude modulated pulse, a pulse transmitted at a fixed pulse rate, a pulse transmitted at a variable pulse rate, and a pulse transmitted at a pseudo-random pulse rate.

29. An electric power supply, comprising:
providing a electric conduit that contains electric power;
means for transferring the electric power to a device;
means for transmitting a plurality of ultra-wideband pulses though the electric conduit to the device;
means for receiving a plurality of ultra-wideband pulses from the device though the electric conduit.

30. The electric power supply of claim 29, wherein the device is ultra-wideband enabled and is selected from a group of consisting of: a phone, a personal digital assistant, a portable computer, a laptop computer, a network, a video monitor, a computer monitor, a home appliance, an office appliance, and a device employing ultra-wideband technology.

31. The electric power supply of claim 29, wherein the electric conduit is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

* * * * *